United States Patent [19]
Matsuoka

[11] Patent Number: 5,400,884
[45] Date of Patent: Mar. 28, 1995

[54] TORQUE CONVERTOR

[75] Inventor: Yoshihiro Matsuoka, Neyagawa, Japan

[73] Assignee: Kabushiki Kaisha Daikin Seisakusho, Osaka, Japan

[21] Appl. No.: 59,537

[22] Filed: May 11, 1993

[30] Foreign Application Priority Data

| May 14, 1992 | [JP] | Japan | 4-031766 U |
| May 14, 1992 | [JP] | Japan | 4-031767 U |
| May 18, 1992 | [JP] | Japan | 4-032524 U |
| May 18, 1992 | [JP] | Japan | 4-124714 |
| May 25, 1992 | [JP] | Japan | 4-132459 |

[51] Int. Cl.6 .................................. F16H 45/02
[52] U.S. Cl. ........................ 192/3.25; 192/3.21; 192/3.3; 192/3.33; 192/70.12; 192/70.28; 192/113.34; 192/113.5; 60/339; 60/358
[58] Field of Search ............ 192/3.21, 3.25, 3.26, 192/3.29, 3.3, 3.33, 70.12, 70.28, 113.34, 113.5; 60/339, 358

[56] References Cited

U.S. PATENT DOCUMENTS

| Re. 24,991 | 5/1961 | Alexandrescu | 192/3.33 X |
| 2,627,189 | 2/1953 | McFarland . | |
| 2,850,921 | 9/1958 | Knowles | 192/3.33 X |
| 4,257,509 | 3/1981 | Hiraiwa et al. . | |
| 4,548,306 | 10/1985 | Hartz | 192/70.28 |
| 4,860,861 | 8/1989 | Gooch et al. | 192/3.26 |
| 5,020,646 | 6/1991 | Koshimo | 192/3.25 |

Primary Examiner—Richard M. Lorence
Attorney, Agent, or Firm—Knobbe, Martens, Olson & Bear

[57] ABSTRACT

A torque convertor includes a torque convertor body and a power disconnecting clutch. The torque convertor body is connected to an input-side member for transmitting power to the power disconnecting clutch. The power disconnecting clutch has a drive-side member connected to the torque convertor body, a driven-side member connectable to an output-side member, a clutch part for connecting and disconnecting the drive-side member to and from the drive-side member, and an elastic connecting part for elastically connecting the drive-side member and the output-side member. One aspect of the torque convertor includes a sealing mechanism for preventing hydraulic fluid in the torque convertor from entering a space where the power disconnecting clutch is disposed. Another aspect of torque convertor includes a lock-up clutch disposed radially outward of the torque convertor body for connecting and disconnecting the input-side rotation member to and from the power disconnecting clutch. The further aspect of the torque convertor includes an oil lubricating structure having an oil pump and an oil storing part.

62 Claims, 6 Drawing Sheets

TORQUE CONVERTOR

BACKGROUND OF THE INVENTION

The present invention relates generally to a torque convertor, and more particularly to a torque convertor comprising a power disconnecting clutch for connecting a torque convertor body (a toroidal member) and an output-side member.

In general, a torque convertor transmits power by means of hydraulic fluid. Wherein such a torque convertor is provided to a manual speed change gear (For example, Japanese Utility Model Laid-Open No. 38355/1989) in order to increase torque at start, a power disconnecting clutch is installed between a turbine in a torque convertor body and an output shaft. A combination of the manual speed change gear and the torque convertor realizes a semi-automatic power transmission device.

In the above described conventional torque converter, hydraulic operating fluid from the torque convertor body enters a space where the power disconnecting clutch is disposed. In the torque converter having such a structure, a large amount of hydraulic operating fluid is supplied to a clutch part. This hydraulic operating fluid functions as lubricating oil. However, the large amount of hydraulic fluid in the clutch part causes drag torque at the time of disconnecting power. When the drag torque is generated, the rotation of the torque convertor is transmitted to an output-side member through each plate, so that it may, in some cases, be difficult to shift gear by the manual speed change gear. Moreover, it is very difficult to control the flow amount of the hydraulic operating fluid entering the clutch part from the torque convertor body. Therefore, it is difficult to achieve both the reduction in the drag torque and the improvement in lubricity.

The power disconnecting clutch is mainly composed of a drive-side member fixed to the turbine, a driven-side member connectable to the output-side member, and a clutch part for connecting and disconnecting both the members to and from each other. The clutch part comprises a plurality of annular plates respectively attached to the drive-side member and the driven-side member so as to be movable in the axial direction and alternately disposed, and a piston for pressing the plurality of plates against each other.

Generally in a dry clutch device, a clutch disk is provided with a cushioning member such as a cushioning plate to alleviate a shock at the time of engaging the clutch. In the power disconnecting clutch provided in the above described conventional torque convertor, the clutch is rapidly engaged, so that a shock is produced at the time of engagement. This shock at the time of engagement is transmitted to the speed change gear side through the output-side member, thereby to cause noise.

Furthermore, the above described conventional torque convertor is inferior in discharge characteristics because it is so constructed that lubricating oil stored in the space where the power disconnecting clutch is disposed is discharged outward through winding oil passages, resulting in energy loss due to the inertia of the hydraulic fluid and aggravating the above described problem of the drag torque.

Furthermore, examples of the conventional torque convertor include one provided with a lock-up clutch for transmitting power by directly connecting an input-side rotation member and a power disconnecting clutch to each other. In the conventional torque convertor, the power disconnecting clutch has been already disposed laterally of the torque convertor body. If the lock-up clutch is installed, therefore, the axial length of the entire torque convertor is increased.

Additionally, in the torque convertor, hydraulic operating fluid and lubricating oil are generally supplied by an oil pump fixed to a housing on the speed change gear side. The hydraulic operating fluid pumped up by the oil pump is supplied to respective portions by a control valve through oil passages. The oil pump is generally driven utilizing the rotation of the input-side rotation member in the torque convertor. Specifically, an oil pump gear fixed to a part of the torque convertor engages with a driving gear of the oil pump. If the torque convertor is rotated, the oil pump gear is rotated, whereby the oil pump is driven. In such a structure, engaging portions of the oil pump gear and the driving gear of the oil pump are lubricated by an oil circuit exclusively provided. However, this circuit makes the structure complicated.

Furthermore, the above described torque convertor comprising with the torque convertor body and the power disconnecting clutch makes it possible for the conventional manual power transmission device to convert into a semi-automatic power transmission device. That is, if a vehicle having the conventional manual clutch device is equipped with the above described torque convertor having the torque convertor body and the power disconnecting clutch in place of the manual clutch, thereby to make it possible to shift gear without depressing a clutch pedal. In this case, it is desirable to exchange the clutch device without altering the other portions of the vehicle equipped with the manual speed change gear.

SUMMARY OF THE INVENTION

An object of the present invention is to reduce a shock at the time of engaging a power disconnecting clutch in a torque convertor and reduce drag torque at the time of disengaging the same.

Another object of the present invention is to decrease the axial length of a torque convertor comprising a power disconnecting clutch and a lock-up clutch.

A further object of the present invention is to lubricate an oil pump gear without exclusively providing an oil circuit.

A still further object of the present invention is to make it possible to change a manual power transmission device to an semi-automatic power transmission device without difficulty.

A torque convertor according to an aspect of the present invention is for transmitting power from an input-side rotation member to an output-side member, and comprises a torque convertor body, a power disconnecting clutch, and a sealing mechanism. The torque convertor body is supplied with hydraulic operating fluid for transmitting power and can be connected to the input-side rotation member. The power disconnecting clutch has a drive-side member connected to the torque convertor body, a driven-side member connectable to the output-side member, a clutch part for connecting and disconnecting the drive-side member to and from the driven-side member, and an elastic connecting part for elastically connecting the driven-side member and an output shaft to each other. The sealing mechanism prevents the hydraulic operating fluid in the torque convertor body from entering a space where the power disconnecting clutch is disposed.

In this torque convertor, if the clutch part of the power disconnecting clutch is engaged, power is transmitted to the output shaft from the torque convertor body through the power disconnecting clutch. A shock occurring in the clutch part at the time of engagement is absorbed by the elastic connecting part. If the clutch part of the power disconnecting clutch is disengaged, no power is transmitted to the output-side member. At the time of disengagement, hydraulic operating fluid for the torque convertor is prevented from entering the space where the power disconnecting clutch Is disposed by the sealing mechanism, thereby generating no drag torque due to the supply of a large amount of hydraulic fluid for the torque convertor.

A power disconnecting clutch in a torque convertor according to another aspect of the present invention Is for connecting and disconnecting power to and from an output-side member in a torque convertor comprising an impeller to which power is inputted and a turbine disposed opposite to the impeller, and comprises a drive-side member, a driven-side member, a plurality of first plates, a second place, a pressure member, and an elastic member. The drive-side member is fixed to the turbine. The driven-side member can be connected to the output-side member. The plurality of first plates engage with one of both the drive-side member and the driven-side member so as to be movable in the axial direction. The second plate engages with the other of the members so as to be movable in the axial direction and is disposed so as to be interposed between the plurality of first plates. The pressure member Is a member for pressing the first and second plates against each other. The elastic member is a member disposed between the adjacent first plates, maintaining a predetermined clearance between the adjacent first plates at the time of releasing the pressing by the pressure means, and elastically deformed such that both the plates are pressed against each other at the time of the pressing.

In the power disconnecting clutch in the torque convertor, when the pressure means presses the first and second plates against each other, the elastic member disposed between the adjacent first plates is elastically deformed, so that the respective plates are pressed against each other. An elastic force of the elastic member at this time serves as a cushion to smoothly connect the first plates and the second plate to each other, so that a shock at the time of engagement is alleviated. If the pressing by the pressure means is released, the elastic member maintains a predetermined clearance between the adjacent first plates by the elastic force. Consequently, the generation of the drag torque is restrained, thereby to make it difficult to transmit the rotation of the torque convertor to the driven-side member.

A torque converter according to still another aspect of the present invention comprises a front cover connected to an input-side rotation member, a torque convertor body, a power disconnecting clutch, and a sealing mechanism. The above described torque convertor body comprises an impeller connected to the front cover and a turbine disposed opposite to the impeller. The power disconnecting clutch comprises a drive-side member fixed to the rear surface of the turbine, a driven-side member connectable to an output-side member, and a clutch part disposed on the outer periphery of the drive-side member for connecting and disconnecting both the members to and from each other. The sealing mechanism is a mechanism for preventing hydraulic fluid from the torque convertor body from entering a space where the power disconnecting clutch is disposed. The drive-side member has a wall surface for introducing lubricating oil supplied to its radially inner portion into the clutch part.

In this torque convertor, the hydraulic fluid from the torque convertor body is prevented from entering the space where the power disconnecting clutch is disposed by the sealing mechanism. Therefore, a large amount of hydraulic fluid is not supplied to the clutch part of the power disconnecting clutch from the torque convertor body. The lubricating oil is supplied to this space from the radially inner portion of the drive-side member. The lubricating oil supplied flows radially outward by centrifugal force along the wall surface of the drive-side member. At this time, the wall surface of the drive-side member is in such a shape as to smoothly introduce the lubricating oil into the clutch part of the power disconnecting clutch. Therefore, a suitable amount of lubricating oil can be supplied efficiently and reliably, thereby to make it possible to achieve both the improvement in lubricity and the reduction in the drag torque.

A torque converter according to still another aspect of the present invention comprises a front cover connected to an input-side rotation member, a torque convertor body, and a power disconnecting clutch. The torque convertor body comprises an impeller connected to the front cover and a turbine disposed opposite to the impeller. The power disconnecting clutch is disposed between the front cover and the rear surface of the turbine for transmitting and disconnecting power from the torque convertor body to and from an output-side member. A recession concaved radially outward for concentrating lubricating oil is formed on the inner wall surface of the outer periphery of the above described front cover. A discharge hole for discharging the lubricating oil radially outward is formed in the recession.

In this torque convertor, the lubricating oil supplied to the power disconnecting clutch is moved radially outward by centrifugal force. The lubricating oil is concentrated in the recession formed on the inner wall surface of the outer periphery of the front cover and then, is smoothly discharged radially outward from the discharge hole. Therefore, unnecessary lubricating oil is smoothly discharged outward, thereby to make it difficult for lubricating oil to remain in a space where the power disconnecting clutch is disposed.

A torque convertor according to still another aspect of the present invention comprises a torque converter body, a power disconnecting clutch, and a lock-up clutch. The torque convertor body is in a toroidal shape and is for transmitting power from an input-side rotation member to an output-side member through hydraulic fluid. The power disconnecting clutch is a clutch disposed laterally of the torque convertor body for transmitting and disconnecting the power between the torque convertor body and the output-side member. The lock-up clutch is a clutch disposed radially outward of the torque convertor body and in a space in the axial direction including the torque convertor body and the power disconnecting clutch for connecting and disconnecting the input-side rotation member to and from the power disconnecting clutch.

In this torque convertor, the power is transmitted or disconnected between the torque convertor body and the output-side member by the power disconnecting clutch. In addition, the power is transmitted or disconnected between the input-side rotation member and the power disconnecting clutch. In this case, the lock-up clutch is disposed radially outward of the torque convertor body and in the space in the axial direction including the torque convertor body and the power disconnecting clutch. Accordingly, the axial length of the torque convertor is decreased.

An oil pump gear lubricating structure according to a further aspect of the present invention is an oil pump gear lubricating structure of a torque convertor comprising a torque convertor body having in its radially inner end a hub projecting outward in the axial direction and an oil pump gear fixed to the axially outer end of the hub and engaging with a driving gear for driving an oil pump. The oil pump gear has on its outer periphery a projection projecting outward in the axial direction such that it can receive hydraulic operating fluid leaking out of the radially inner portion of the hub. The projection has a through hole for introducing the hydraulic fluid into tooth portions of the gears.

In this oil pump gear lubricating structure of the torque convertor, the hydraulic operating fluid leaked out of the torque convertor body through the radially inner portion of the hub. This hydraulic fluid is received in the inside of the projection of the oil pump gear. The hydraulic fluid lubricates the tooth portions of the oil pump gear and the driving gear through the through hole in the projection by centrifugal force. In this case, it is possible to lubricate the oil pump gear without exclusively providing an oil circuit.

A power transmission device according to a still further aspect of the present invention is a device which can be mounted on a manual speed change gear in a vehicle for transmitting power from the engine to the manual speed change gear and comprises a torque convertor body, a power disconnecting clutch, a housing, an oil storing part, an oil pump, and a control valve. The torque convertor body is supplied with hydraulic operating fluid for transmitting power and can be connected to an input-side rotation member on the side of the above described engine. The above described power disconnecting clutch is for transmitting and disconnecting power between the torque convertor body and the manual speed change gear. The housing is for containing the torque convertor body and the power disconnecting clutch. The oil storing part is disposed at the bottom of the housing for storing hydraulic fluid to be supplied to the torque convertor body and the power disconnecting clutch. The oil pump is fixed to the housing for pumping up the hydraulic fluid in the oil storing part. The control valve is provided in the housing for controlling the flow of the hydraulic fluid from the oil pump to supply the hydraulic fluid to the torque convertor body and the power disconnecting clutch.

In this power transmission device, the housing contains the torque convertor body and the power disconnecting clutch and is provided with the oil storing part, the oil pump and the control valve. That is, all the constituent elements of the power transmission device, along with the housing, are formed as a unit. Therefore, the housing in the clutch device in a vehicle with the conventional manual speed change gear is replaced with a unit including the housing according to the present invention, thereby to make it possible to make a manual transmission device into a semi-automatic power transmission without difficulty.

The foregoing and other objects, aspects and advantages of the present invention will become more apparent from the following detailed description.

DESCRIPTION OF THE PREFERRED EMBODIMENTS

Structure

FIGS. 1 to 5 show a torque convertor according to one embodiment of the present invention, wherein a line o—o represents its rotational axis.

Figure 1:
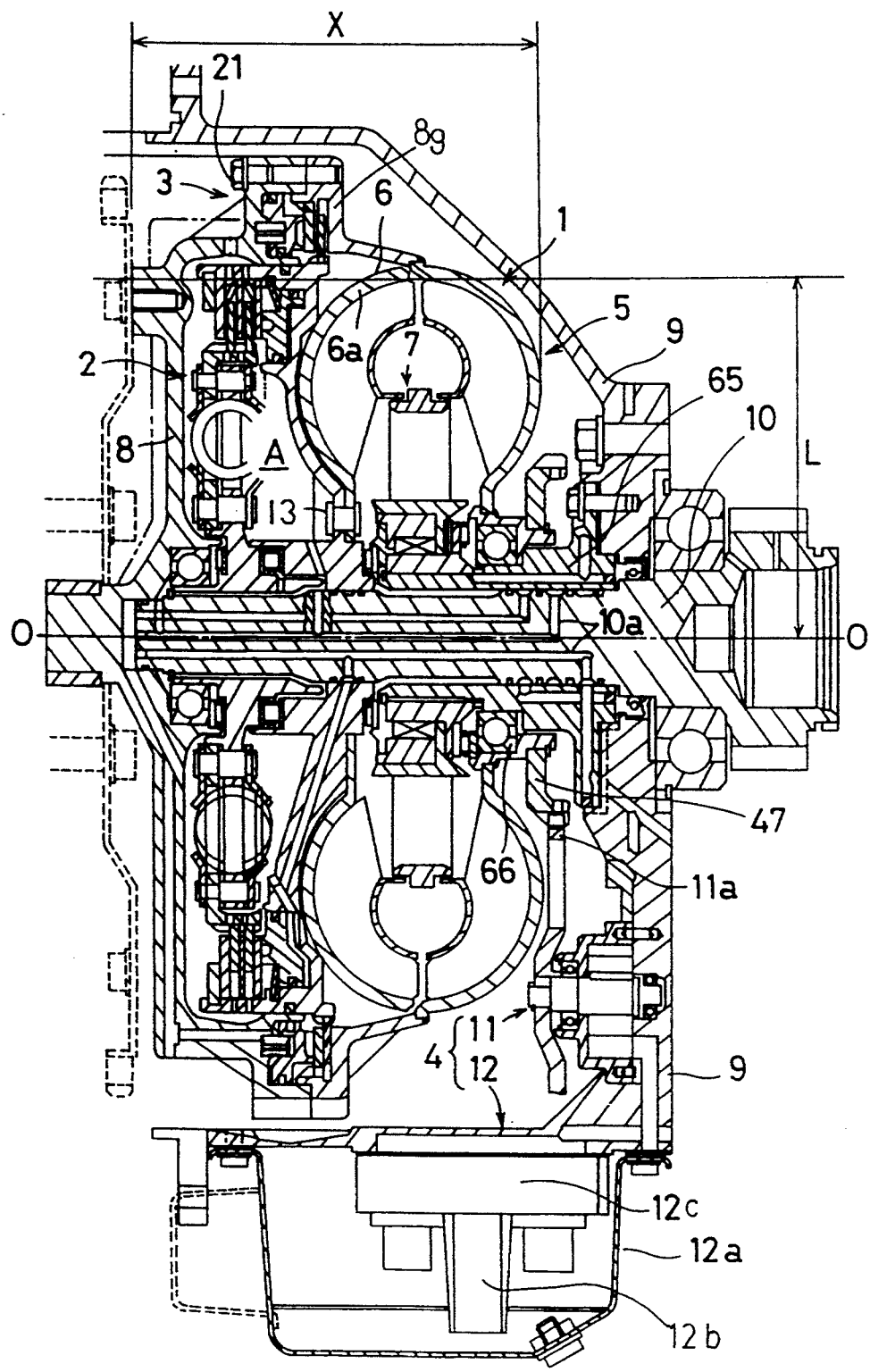
FIG. 1 is a vertical sectional view showing a torque convertor according to one embodiment of the present invention.

In FIG. 1, the torque convertor is mainly composed of a torque convertor body 1 comprising three types of vane wheels and having a toroidal shape, a power disconnecting clutch 2 for transmitting and disconnecting power from the torque convertor body 1 to and from a main drive shaft 10, and a lock-up clutch 3 for directly transmitting the power to the clutch 2. The torque convertor body 1 comprises an impeller 5, a turbine 6 disposed opposite to the impeller 5, and a stator 7 disposed between the radially inner portions of the impeller 5 and the turbine 6. A flange member 8g (as described later) welded to the radially outer portion of the impeller 5 is fixed to a front cover 8 by bolts 21 so that the impeller 5 is rotated integrally with the front cover 8. Torque is inputted to the front cover 8 from the engine side (the left side of FIG. 1). Further, an oil supply part 4 for supplying hydraulic operating fluid and lubricating oil to the power disconnecting clutch 2 and the lock-up clutch 3 is provided below the torque convertor body 1.

A housing 9 is so disposed as to cover the above described torque convertor and is fixed to a housing (not shown) on the manual speed change gear side (the right side of FIG. 1). The main drive shaft 10 connected to a manual speed change gear (not shown) is disposed in the center of the housing 9. A plurality of oil passages 10a are provided in the main drive shaft 10. The hydraulic operating fluid and the lubricating oil are supplied to the entire torque convertor through the oil passages 10a. An outer shaft 65 fixed to the housing 9 is fitted around the main drive shaft 10. The outer shaft 65 fixes an inner race of the stator 7 and rotatably supports the radially inner portion of the impeller 5 through a bearing 66.

The oil supply part 4 comprises an oil pump 11 fixed to the housing 9 and an oil suction part 12. A driving gear 11a of the oil pump 11 engages with an oil pump gear 47 fixed to the impeller 5 and is driven as the impeller 5 is rotated. The oil suction part 12 is provided below the torque convertor and comprises a tank 12a in which the hydraulic operating fluid and the lubricating oil discharged from the torque convertor are stored and a suction part 12b for sucking the hydraulic fluid stored in the tank 12a. A control valve 12c for controlling the flow of the hydraulic fluid from the suction part 12b is disposed above the suction part 12b. This control valve 12c is fixed to the bottom of the housing 9. The hydraulic fluid stored in the tank 12a are sent to the control valve 12c from the suction part 12b by the oil pump 11 and is supplied to respective portions of the torque convertor through the oil passages 10a from the control valve 12c.

Figure 2:
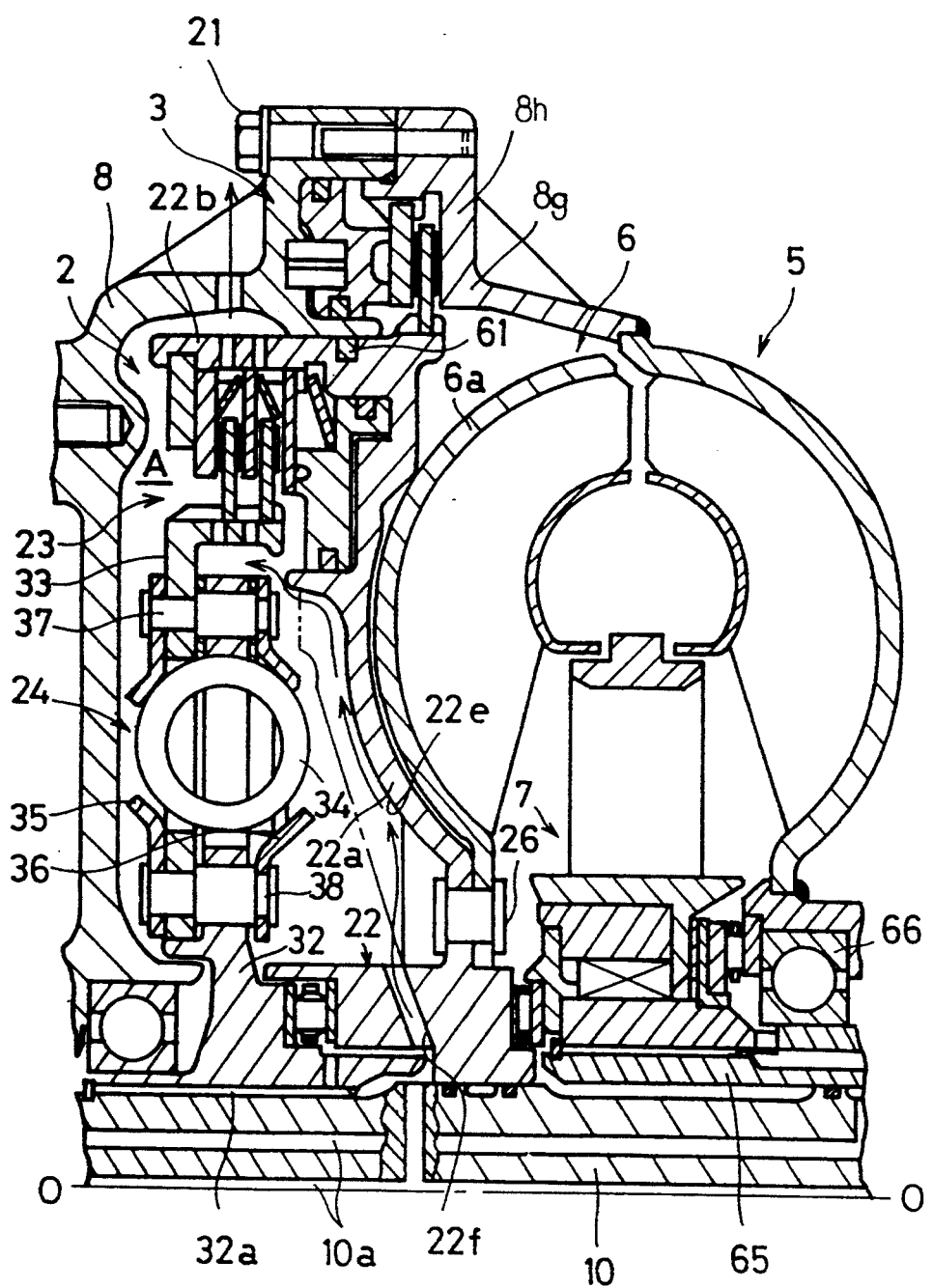
FIG. 2 is an enlarged partial view of FIG. 1.

The power disconnecting clutch 2 is disposed within space A formed between the torque convertor body 1 and the front cover 8. The power disconnecting clutch 2 is mainly composed of a hub 22 a clutch part 23, a damper connecting part 24, as shown in FIG. 2.

Figure 3:
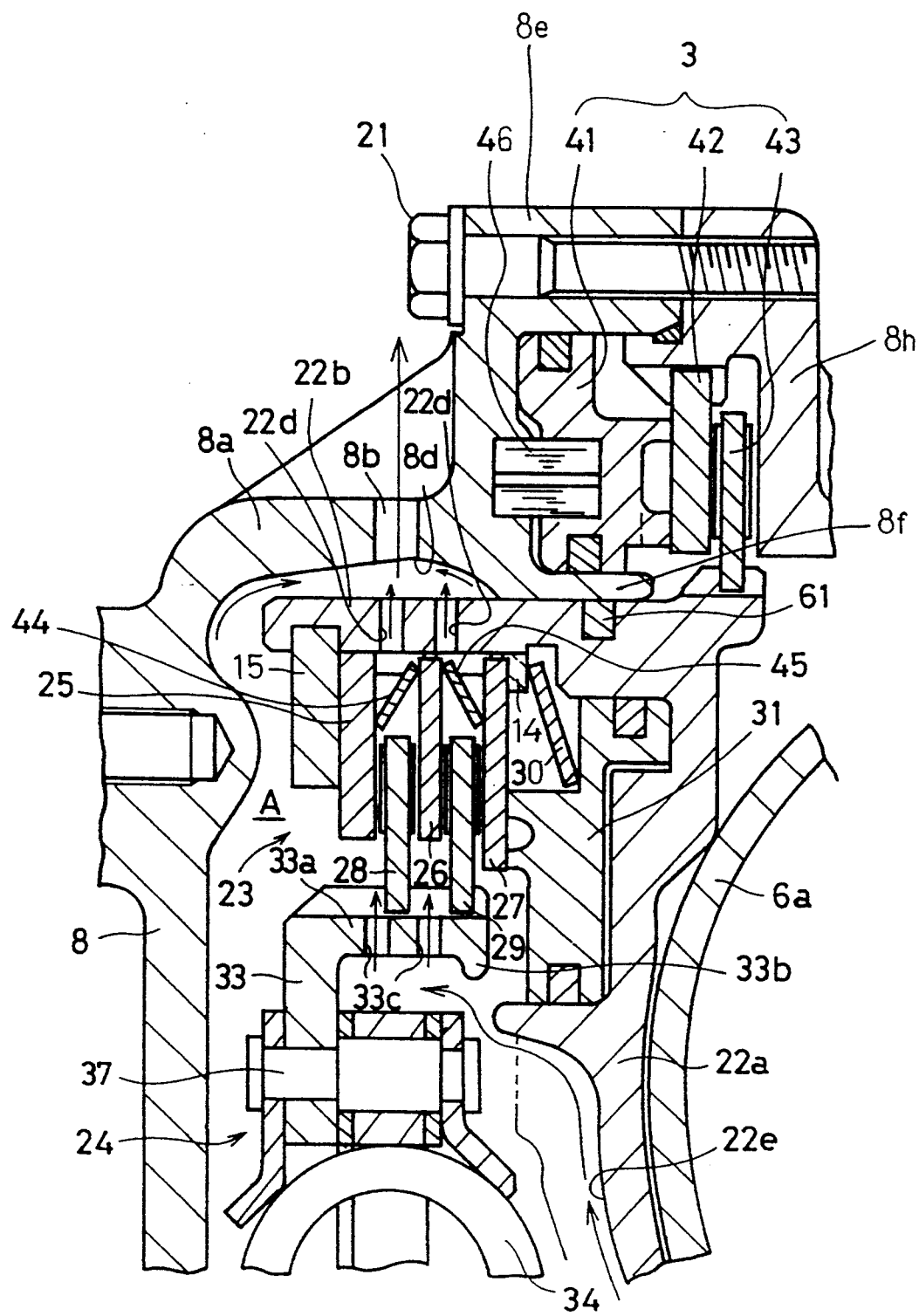
FIG. 3 is an enlarged partial view of FIG. 2.

The hub 22 is rotatably fitted onto the main drive shaft 10 and has holes 22f for supplying lubricating oil to the space A from the oil passages 10a. In addition, the hub 22 is integrally provided with a flange 22a extending radially outward. The radially inner portion of the flange 22a is fixed to a shell 6a of the turbine 6 by a plurality of rivets 13. A cylindrical portion 22b extending toward the front cover 8 is Integrally formed in the radially outer end of the flange 22a. As shown in FIG. 3, a seal ring 61 is disposed between the inner surface of an inner cylindrical wall 8f (as described later) provided in a cylindrical portion 8a of the front cover 8 and the outer surface of the cylindrical portion 8a. The space A is cut off from a space on the side of the torque convertor body 1 by the seal ring 61. As a result, hydraulic operating fluid in the torque convertor body 1 is prevented from entering the space A.

Figure 4:
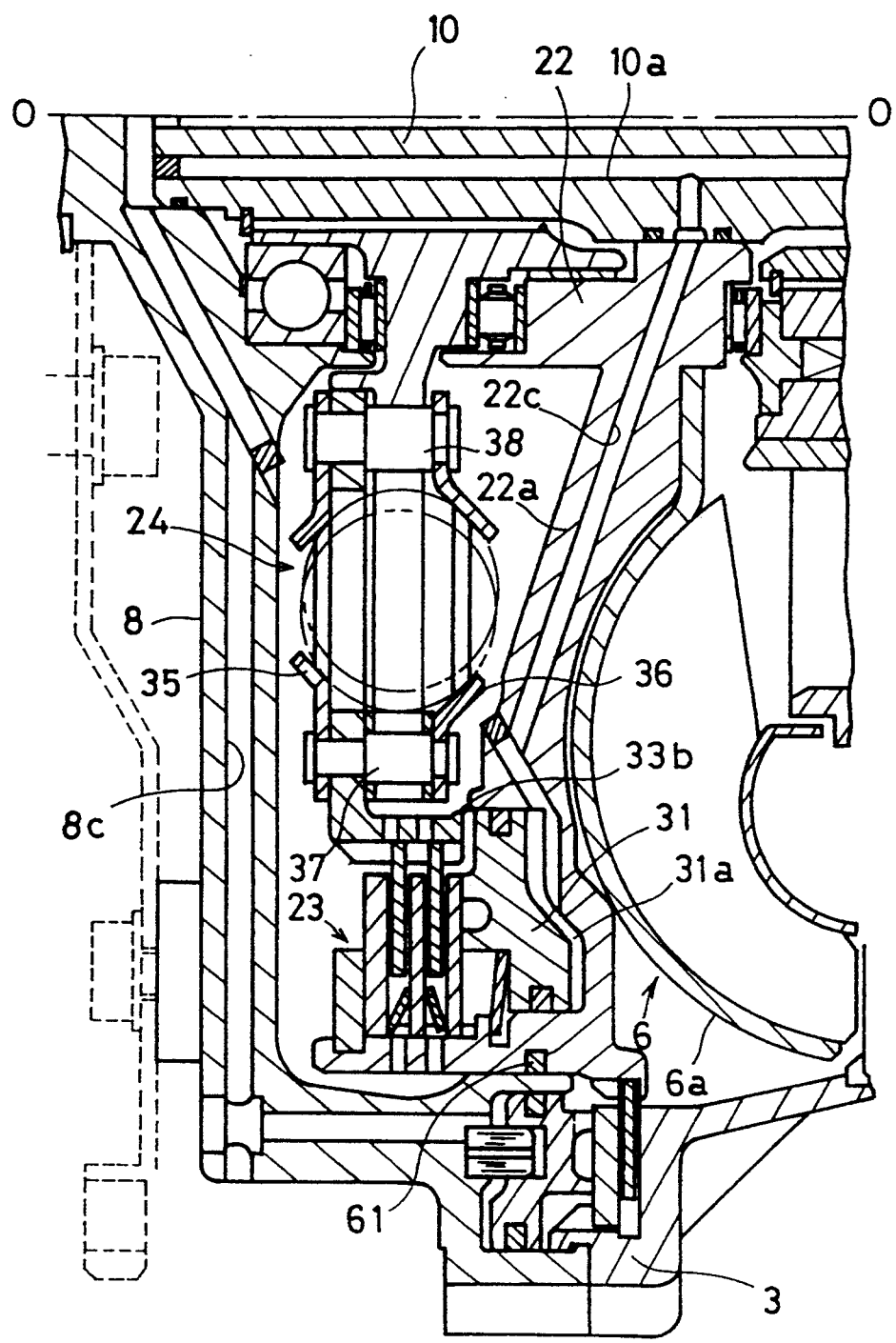
FIG. 4 is an enlarged partial view of FIG. 1.

As shown in FIG. 4, an oil passage 22c by which the oil passages 10a and an oil chamber 31a disposed on the rear surface of a first piston 31 communicate with each other is further provided in the hub 22 including the flange 22a. In addition, the flange 22a is smoothly curved along the rear surface of the shell 6a. As a result, lubricating oil coming out of the hole 22f is smoothly introduced radially outward and toward the engine (the left of FIG. 4) along the wall surface 22e of the flange 22a.

As shown In FIG. 3, a clutch part 23 of the power disconnecting clutch 2 is mainly composed of annular first plates 25, 26 and 27 provided on the side of the radially inner portion of the cylindrical portion 22b, and annular second plates 28 and 29 provided on the side of the damper connecting part 24, and an annular first piston 31 for pressing both the first and second plates against each other. The radially outer portions of the first plates 25, 26 and 27 are spline fitted into the inner surface of the cylindrical portion 22 and are movable in the axial direction. In addition, the movement in the axial direction of the first plates 25, 26 and 27 is limited by retaining rings 14 and 15 fixed to the inner surface of the cylindrical portion 22b. On the other hand, the second plate 28 is disposed between the first plates 25 and 26, and the second plate 29 is disposed between the first plates 26 and 27. Annular facing members are attached to both surfaces of each of the second plates 28 and 29.

First washer type conical springs 44 and 45 are disposed radially outward of the second plates 28 and 29 among the first plates 25, 26 and 27, that is, between the first plates 25 and 26, and between the first plates 26 and 27, respectively. Sufficient clearances are respectively ensured between the first plates 25 and 26 and between the first plates 26 and 27 by the first washer type conical springs 44 and 45 at the time of disengaging the clutch. The two first washer type conical springs 44 and 45 are set to the same in size and spring constant. Accordingly, the first plate 26 in the center is located in the center between the other first plates 25 and 27 oil both sides of the first plate 26. In addition, the radially outer portions of the first washer type conical springs 44 and 45 have a spline structure engaging with a spline of the cylindrical portion 22b. A clearance through which lubricating oil can pass is formed between the spline in the radially outer portions of the first washer type conical springs 44 and 45 and, the spline of the cylindrical portion 22b.

Holes 22d are formed with circumferential spacing in a plurality of places between the first plates 25 and 27 in the cylindrical portion 22b.

Furthermore, the cylindrical portion 8a of the front cover 8 provided radially outward of the holes 22d has on its inner wall surface a recession 8d concaved outward in the radial direction, and a plurality of discharge holes 8b are formed in the recession 8d. Specifically, lubricating oil supplied among the first plates 25, 26 and 27 and lubricating oil within the space A are discharged outward through the discharge holes 8b. That is, the lubricating oil within the space A is moved radially outward by centrifugal force and is concentrated once in the recession 8d on the inner wall surface of the cylindrical portion 8b and then, is efficiently discharged through the discharge holes 8b.

The first piston 31 is disposed between the first plate 27 and the flange 22a. The first piston 31 is pressed against the flange 22a by a second washer type conical spring 30. The first piston 31 is moved toward the left of FIG. 3 by hydraulic operating fluid supplied from the oil passage 22c (see FIG. 4) formed in the flange 22a, to connect the first plates 25, 26 and 27 with the second plates 28 and 29.

As shown in FIG. 2, the damper connecting part 24 is mainly composed of a driven hub 32, a driven plate 33, and torsion springs 34. The driven hub 32 has in radially inner portion a spline 32a spline fitted to the main drive shaft 10. The driven hub 32 has a flange extending radially outward. The flange of the driven hub 32 and the driven plate 33 are connected to each other elastically in the circumferential direction by the torsion springs 34 disposed in window holes extending in the circumferential direction formed in the driven hub 32 and the driven plate 33. The torsion springs 34 are held by disk-shaped retaining plates 35 and 36 so as not to come off both the window holes. The retaining plates 35 and 36 are fixed to the driven plate 33 by a plurality of stud pins 37 and 38 in their radially outer and inner portions. A long hole extending in the circumferential direction is formed in portions through which the stud pins 37 and 38 pass in the driven hub 32. Consequently, the rotation of the driven plate 33 relative to the driven hub 32 is allowed.

As shown in FIG. 3, a cylindrical-shaped engaging portion 33a extending toward the torque convertor body 1 is integrally formed in the radially outer end of the driven plate 33. A spline engaging with the radially inner ends of the above described second plates 28 and 29 so as to be movable only in the axial direction is formed on the outer surface of the engaging portion 33a. In addition, a plurality of radially penetrating through holes 33c are formed in the engaging portion 33a. An annular projection 33b projecting radially inward is formed in an axial end of the engaging portion 33a. As a result, lubricating oil introduced into the engaging portion 33a is dammed up by the projection 33b and is efficiently supplied to the clutch part 23 through the through holes 33c. The wall surface 22e of the flange 22a of the hub 22 is projected toward the engaging portion 33b and close thereto so as to efficiently supply the lubricating oil to the engaging portion 33b.

Meanwhile, the discharge holes 8b in the front cover 8, the holes 22d in the cylindrical portion 22b, and the through holes 33c in the engaging portion 33a are formed in approximately the same position in the axial direction.

Description is now made of the lock-up clutch 3.

The lock-up clutch 3 is disposed in an annular space between an annular groove between an outer cylindrical wall 8e and an inner cylindrical wall 8f provided in the cylindrical portion 8a of the front cover 8, and an annular disk portion 8h of the flange member 8g fixed to the outer cylindrical wall 8e by the bolts 21. As shown in FIG. 1, the lock-up clutch 3 contributes to the decrease in the axial length of the entire torque convertor because it is disposed out of the radial length L of a torus comprising the impeller 5, the turbine 6 and the stator 7, and is disposed within the axial length X including the torque convertor body 1 and the power disconnecting clutch 2.

As shown in detail in FIG. 3, the lock-up clutch 3 is mainly composed of an annular second piston 41 provided in the front cover 8 so as to be movable in the axial direction, an annular third plate 42 having its radially outer end engaging with the flange member 8g so as to be movable in the axial direction and relatively non-rotatable and pressed by the second piston 41, and an annular fourth plate 43 having radially inner end engaging with the cylindrical portion 22b so as to be movable in the axial direction and relatively non-rotatable, and disposed between the third plate 42 and the annular disk portion 8h of the flange member 8g. Annular friction members adhere to both surfaces of the fourth plate 43. Locking members 46 are disposed between the second piston 41 and the front cover 8. The locking members 46 slidably fit in the second piston 41 such that the second piston 41 can shift its position in a horizontal direction. When hydraulic operating fluid is supplied from the oil passage 8c (see FIG. 4) provided in the front cover 8, the second piston 41 is moved toward the right of FIG. 3, to press the third plate 42 and the fourth plate 43.

Figure 5:
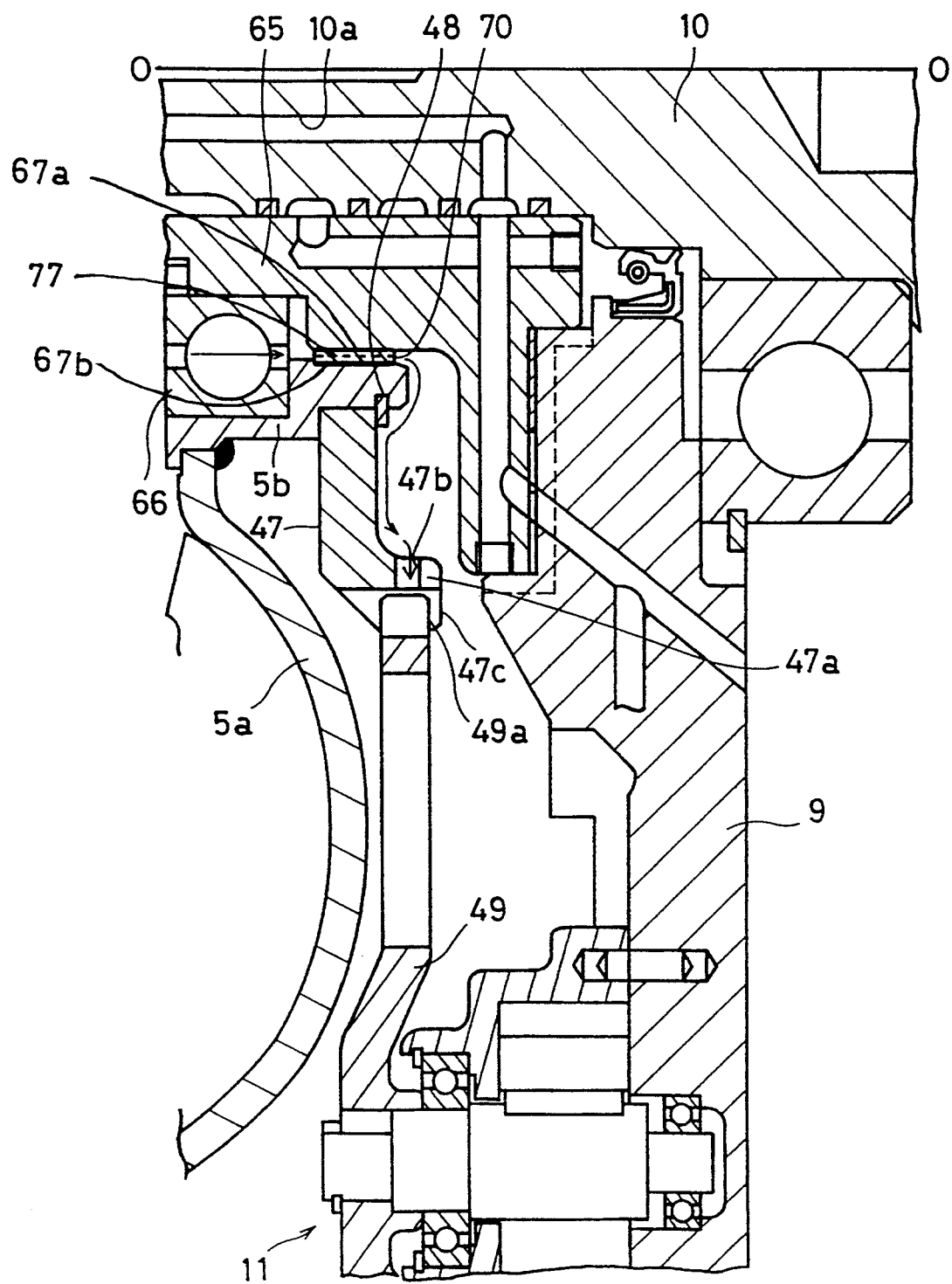
FIG. 5 is an enlarged partial view of FIG. 1.

An oil pump gear lubricating structure will be described in detail with reference to FIG. 5.

An impeller shell 5a constituting the impeller 5 has radially inner end welded to an impeller hub 5b. The impeller hub 5b is rotatably supported on the outer shaft 65 through the bearing 66. A bush 70 is disposed between a portion on the speed change gear side (the right side of FIG. 5) of the impeller hub 5b and the outer shaft 65. Clearances 67a and 67b through which a predetermined amount of hydraulic fluid can pass are formed between the bush 70 and the outer shaft 65, and between the bush 70 and the impeller hub 5b. An oil passage groove 77 may be formed on the inner surface and the outer surface of the bush 70. The oil pump gear 47 engaging with a driving gear 49 is fixed to the axially outer end of the impeller hub 5b on the outside (on the right side) in the axial direction of the impeller shell 5a. The oil pump gear 47 is fixed to the impeller hub 5b by a key (not shown) so as not to be rotatable and is positioned in the axial direction by a C ring 48 serving as a retaining member. The outer periphery of the oil pump gear 47 projects in the direction away from the impeller shell 5a (toward the right of FIG. 5). In addition, radial through holes 47b are formed in a plurality of places of the projection 47a so that lubricating oil is introduced into engaging portions of a tooth portion 47a of the oil pump gear 47 and a tooth portion 49a of the driving gear 49.

Figure 6:
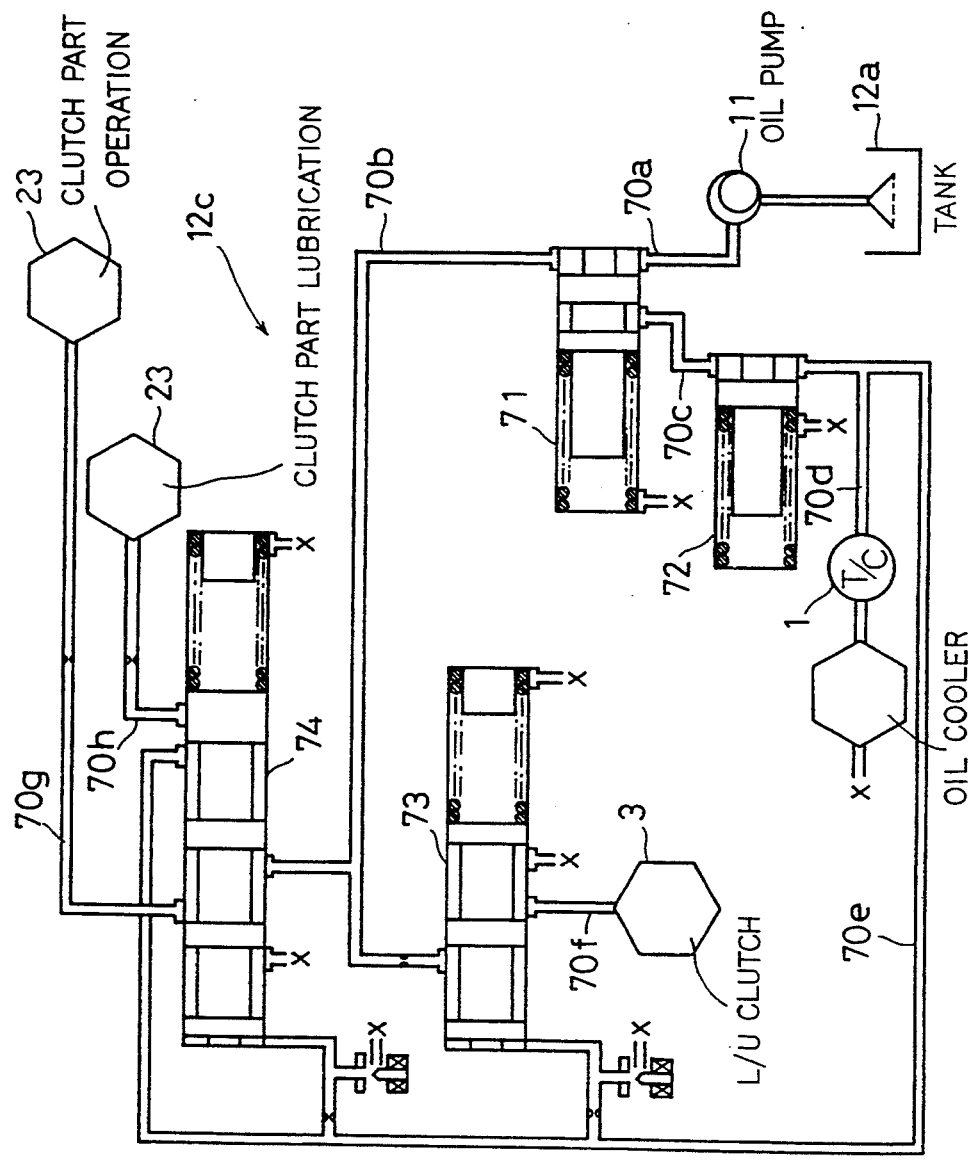
FIG. 6 is a circuit diagram showing a control valve.

FIG. 6 is a circuit diagram showing the control valve 12c.

The control valve 12c comprises first and second pressure control valves 71 and 72 disposed between the oil pump 11 and the torque convertor body 1, a first control valve 73 for controlling the supply of hydraulic operating fluid to the lock-up clutch 3, and a second control valve 74 for controlling the supply of lubricating oil to the clutch part 23 of the power disconnecting clutch 2. The second control valve 74 also controls the supply of hydraulic operating fluid to the clutch part 23 the power disconnecting clutch 2. The oil pump 11 is connected to an input port of the first pressure control valve 71 through an oil passage 70a. A first output port of the first pressure control valve 71 is connected to an input port of the first control valve 73 and a first input port of the second control valve 74 through an oil passage 70b, and a second output port thereof is connected to an input port of the second pressure control valve 72 through an oil passage 70c. An output port of the second pressure control valve 72 is connected to the torque convertor body 1 through an oil passage 70d, and is connected to respective control ports of the first and second control valves 73 and 74 and a second input port of the second control valve 74 through an oil passage 70e. An output port of the first control valve 73 is connected to the lock-up clutch 3 through an oil passage 70f. In addition, a first output port of the second control valve 74 is connected to the power disconnecting clutch 2 through an oil passage 70g, and a second output port thereof supplies lubricating oil to the clutch part 23 of the power disconnecting clutch 2 through an oil passage 70h.

According to the present embodiment described in the foregoing, the torque convertor body 1 and the power disconnecting clutch 2 are contained in the housing 9, and the oil pump 11, the tank 12a and the control valve 12c are fixed to the housing 9 and formed as a unit. Therefore, in a vehicle comprising the conventional manual clutch it is possible to convert the manual power transmission device to the semi-automatic power transmission device with difficulty by only replacing the clutch housing with the unit according to the present invention.

Operation

If power is transmitted to the front cover 8 from the engine side, the impeller 5, along with the front cover 8, is rotated, and the turbine 6 is further rotated through hydraulic operating fluid. The rotation of the turbine 6 is transmitted to the main drive shaft 10 through the hub 22 and the flange 22a, the clutch part 23, and the damper connecting part 24.

Furthermore, if the impeller 5 is rotated, the oil pump gear 47 fixed to the impeller 5 is driven. As a result, the oil pump 11 is driven, so that hydraulic fluid stored in the tank 12a is sucked and is supplied as hydraulic operating fluid and lubricating oil to predetermined places through the oil passages 10a in the main drive shaft 10 by the control valve 12c.

The hydraulic operating fluid leaking out of the torque convertor body 1 by pressure passes through the bearing 66 and further passes through the clearances on both sides of the bush 70, to move toward the right of the figure. This hydraulic fluid is moved radially outward by centrifugal force and is concentrated in the projection 47a of the oil pump gear 47, to be dammed up. The hydraulic fluid thus stored is supplied to the engaging portions of the tooth portion 47c of the oil pump gear 47 and the tooth portion 49a of the driving gear 49 through the through holes 47b, thereby to lubricate the engaging portions. The hydraulic fluid after the lubrication is moved downward, to be stored in the tank 12a.

In the above described oil pump gear lubricating structure, the thickness of the bush 70 may be adjusted or the shape and the like of a lubricating groove formed in the bush 70 may be altered, thereby to make it possible to set the amount of hydraulic fluid supplied as lubricating oil to a suitable value. In addition, the hydraulic fluid supplied is received once in the projection 47a, thereby to make it possible to supply the lubricating oil to the tooth portions efficiently without being dispersed to the other portions.

On the other hand, as indicated by an arrow in FIG. 2, lubricating oil supplied from the oil passages 10a is supplied to the space A where the power disconnecting clutch 2 is disposed through the oil passage 22f. The lubricating oil supplied to this space is moved radially outward by centrifugal force. At this time, as shown in an enlarged manner in FIG. 3, the lubricating oil is supplied to the engaging portion 33a smoothly along the wall surface 22e of the flange 22a. In this case, the dispersion is prevented by the projection 33b. Accordingly, the lubricating oil is efficiently supplied to the clutch part 23 through the through holes 33c, to lubricate the first plates 25, 26 and 27 and the second plates 28 and 29. In addition, the lubricating oil passes through the holes 22d from the spline fitted portions of the first washer type conical springs 44 and 45 and is concentrated in the recession 8d on the inner wall surface of the cylindrical portion 8a. In addition, the other lubricating oil in the space A is also moved radially outward by centrifugal force and is similarly concentrated in the recession 8d on the inner wall surface of the cylindrical portion 8a. The hydraulic fluid concentrated is discharged outward from the space A through the discharge holes 8b. The lubricating oil discharged outward is moved downward, to be stored in the tank 12a.

In this case, it is the seal ring 61 that prevents the hydraulic operating fluid in the torque convertor body 1 from flowing into the space A where the power disconnecting clutch 2 is disposed. Accordingly, the supply and the discharge of the lubricating oil can be accurately controlled. Consequently, the lubricating oil is smoothly and efficiently supplied to the clutch part 23, and it can be discharged quickly and efficiently. Consequently, it is possible to reliably supply a required amount of lubricating oil when required, to reduce drag torque generated between the second plates 28 and 29 and the first plates 25, 26 and 27 when the power disconnecting clutch 2 is disengaged.

Moreover, at the time of disengaging the power disconnecting clutch 2, the first washer type conical springs 44 and 45 separate the first plates 25 to 27 from one another, to maintain predetermined clearances among the first plates 25 to 27. Consequently, it is possible to further reduce the drag torque generated by the power disconnecting clutch 2.

Furthermore, at the time of engaging the power disconnecting clutch, the first washer type conical springs 44 and 45, along with the second washer type conical spring 30, are elastically deformed. Therefore, a shock at the time of engaging the clutch is absorbed. In addition, a shock occurring at the time of engagement is absorbed by the torsion springs 34, thereby to make it difficult to transmit the shock to the main drive shaft 10.

Various details of the invention may be changed without departing from its spirit nor its scope. Furthermore, the foregoing description of the embodiment according to the present invention is provided for the purpose of illustration only, and not for the purpose of limiting of the invention as defined by the appended claims and their equivalents.

What is claimed is:

1. A torque convertor system comprising:
   an input-side rotation member;
   an output-side member;
   a torque convertor body which is supplied with hydraulic operating fluid for transmitting power and can be connected to said input-side rotation member;
   a power disconnecting clutch for transmitting power from said input-side rotation member to said output-side member through said torque convertor body, having a drive-side member connected to said torque convertor body, a driven-side member connectable to said output-side member, a clutch part for connecting and disconnecting said drive-side member to and from said driven-side member, and an elastic connecting part for elastically connecting said driven-side member and said output-side member; and
   a sealing mechanism for preventing the hydraulic operating fluid in said torque convertor body from entering a space where said power disconnecting clutch is disposed,
   a front cover connected to said input-side rotation member, and wherein:
   said torque convertor body comprises an impeller connected to said front cover and a turbine disposed opposite to said impeller,
   said drive-side member is fixed to a rear surface of said turbine, and said clutch part is disposed radially outward of said drive-side member, and
   said drive-side member has a wall surface for introducing lubricating oil supplied to its radially inner portion into said clutch part.

2. A torque convertor system according to claim 1, wherein said power disconnecting clutch is disposed between said front cover and the rear surface of said turbine, and
   a recession concaved radially outward for concentrating the lubricating oil is formed on an inner surface of an outer periphery wall of said front cover, a discharge hole for discharging the lubricating oil radially outward being formed in said recession.

3. A torque convertor system according to claim 2, wherein said clutch part of said power disconnecting clutch comprises:
   a plurality of first plates engaging with said drive-side member and movable in an axial direction,
   at least one second plate engaging with said driven-side member and movable in the axial direction, said second plate being interposed between said plurality of first plates,
   pressure means for pressing said first plates and said second plate against each other, and
   an elastic member disposed between said adjacent first plates, maintaining a predetermined clearance between the adjacent first plates at the time of releasing the pressing by said pressure means, and elastically deformed such that both said first and second plates are pressed against each other at the time of the pressing.

4. A torque convertor system according to claim 3, wherein said drive-side member has a hub, a flange extending radially outward from said hub, fixed to the rear surface of said turbine and having said wall surface, and a first cylindrical portion extending in the axial direction from the outer periphery of said flange,
   said first plate has a radially outer end engaging with an inner surface of said first cylindrical portion so as to be movable in the axial direction and relatively non-rotatable,
   said driven-side member is a disk-shaped plate having on its outer periphery a second cylindrical portion extending in the axial direction, and
   said second plate has radially inner end engaging with an outer surface of said second cylindrical portion so as to be movable in the axial direction and relatively non-rotatable.

5. A torque convertor system according to claim 4, wherein radial through holes are formed in said first and second cylindrical portions.

6. A torque convertor system according to claim 5, wherein a spline is formed on the inner surface of said first cylindrical portion,
   said elastic member is composed of a washer type conical spring, and
   a spline structure engaging with said spline is formed in a radially outer end of said washer type conical spring, a clearance through which lubricating oil can pass being formed between said spline structure and the spline on said first cylindrical portion.

7. A torque convertor system according to claim 5, wherein said discharge hole in said recession of said front cover, said through hole in said first cylindrical portion, and said through hole in said second cylindrical portion are formed in approximately the same position in the axial direction.

8. A torque convertor system according to claim 1, wherein said clutch part of said power disconnecting clutch comprises a plurality of first plates engaging with said drive-side member and movable in an axial direction,
   a second plate engaging with said driven-side member and movable in the axial direction, said second plate being interposed between said plurality of first plates,
   pressure means for pressing said first plates and said second plate against each other, and
   an elastic member disposed between the adjacent first plates, maintaining a predetermined clearance between the adjacent first plates at the time of releasing the pressing by said pressure means, and elastically deformed such that both said plates are pressed against each other at the time of the pressing.

9. A torque convertor system according to claim 8, wherein said drive-side member comprises a hub, a flange extending radially outward from said hub, fixed to the rear surface of said turbine and having said wall surface, and a first cylindrical portion extending in the axial direction from an outer periphery of said flange,
   said first plate has a radially outer end engaging with an inner surface of said first cylindrical portion so as to be movable in the axial direction and relatively non-rotatable,
   said driven-side member is a disk-shaped plate having on its outer periphery a second cylindrical portion extending in the axial direction, and
   said second plate has a radially inner end engaging with an outer surface of said second cylindrical portion so as to be movable in the axial direction and relatively non-rotatable.

10. A torque convertor system according to claim 9, wherein radial through holes are formed in said first and second cylindrical portions.

11. A torque convertor system according to claim 10, wherein a spline is formed on the inner surface of said first cylindrical portion,
    said elastic member is composed of a washer type conical spring, and
    a spline structure engaging with said spline is formed in a radially outer end of said washer type conical spring, a clearance through which lubricating oil can pass being formed between said spline structure and the spline on said first cylindrical portion.

12. A torque convertor system according to claim 10, wherein said holes in said first cylindrical portion and said second cylindrical portion are formed in approximately the same position in the axial direction.

13. A torque convertor system according to claim 1, wherein said power disconnecting clutch is disposed between said front cover and the rear surface of said turbine, and
    a recession concaved radially outward for concentrating lubricating oil is formed on an inner wall surface of an outer periphery of said front cover, a discharge hole for discharging the lubricating oil radially outward being formed in the recession.

14. A torque convertor system according to claim 13, wherein said clutch part of said power disconnecting clutch comprises:
    a plurality of first plates engaging with said drive-side member and movable in an axial direction,
    a second plate engaging with said driven-side member and movable in the axial direction, said second plate being interposed between said plurality of first plates,
    pressure means for pressing said first plates and said second plate against each other, and
    an elastic member disposed between said adjacent first plates, maintaining a predetermined clearance between the adjacent first plates at the time of releasing the pressing by said pressure means, and elastically deformed such that both said plates are pressed against each other at the time of the pressing.

15. A torque convertor system according to claim 14, wherein said drive-side member comprises a hub, a flange extending radially outward from said hub and fixed to the rear surface of said turbine, and a first cylindrical portion extending in the axial direction from an outer periphery of said flange,
    said first plate has a radially outer end engaging with an inner surface of said first cylindrical portion so as to be movable in the axial direction and relatively non-rotatable,
    said drive-side member is a disk-shaped plate having on its outer periphery a second cylindrical portion extending in the axial direction, and
    said second plate has a radially inner end engaging with an outer surface of said second cylindrical portion so as to be movable in the axial direction and relatively non-rotatable.

16. A torque convertor system according to claim 15, wherein radial through holes are formed in said first and second cylindrical portions.

17. A torque convertor system according to claim 16, wherein a spline is formed on the inner surface of said first cylindrical portion,
said elastic member is composed of a washer type conical spring, and
a spline structure engaging with said spline is formed in a radially outer end of said washer type conical spring, a clearance through which lubricating oil can pass being formed between said spline structure and said spline on said first cylindrical portion.

18. A torque convertor system according to claim 16, wherein said discharge hole in the recession of said front cover, said through hole in said first cylindrical portion, and said through hole in said second cylindrical portion are formed in approximately the same position in the axial direction.

19. A torque convertor system according to claim 1, wherein said clutch part of said power disconnecting clutch comprises a plurality of first plates engaging with said drive-side member and movable in an axial direction,
a second plate engaging with said driven-side member and movable in the axial direction, said second plate being interposed between said plurality of first plates,
pressure means for pressing said first plates and said second plate against each other, and
an elastic member disposed between the adjacent first plates, maintaining a predetermined clearance between the adjacent first plates at the time of releasing the pressing by said pressure means, and elastically deformed such that both said plates are pressed against each other at the time of the pressing.

20. A torque convertor system according to claim 19, wherein said drive-side member comprises a hub, a flange extending radially outward from said hub, and a first cylindrical portion extending in the axial direction from an outer periphery of said flange,
said first plate has a radially outer end engaging with an inner surface of said first cylindrical portion so as to be movable in the axial direction and relatively non-rotatable,
said driven-side member is a disk-shaped plate having on its outer periphery a second cylindrical portion extending in the axial direction, and
said second plate has a radially inner end engaging with an outer surface of said second cylindrical portion so as to be movable in the axial direction and relatively non-rotatable.

21. A torque convertor system according to claim 20, wherein radial through holes are formed in said first and second cylindrical portions.

22. A torque convertor system according to claim 21, wherein a spline is formed on the inner surface of said first cylindrical portion,
said elastic member is composed of a washer type conical spring, and
a spline structure engaging with said spline is formed in a radially outer end of said washer type conical spring, a clearance through which lubricating oil can pass being formed between said spline structure and the spline on said first cylindrical portion.

23. A torque convertor system according to claim 22, wherein:
said first plates comprise three disk-shaped plates,
said second plate comprises two disk-shaped plates, and
said washer type conical spring comprises two washer type conical springs having identical size and spring constant so that said first plate in the center is positioned in a substantially equal distance from two other first plates.

24. A torque convertor system according to claim 23, wherein said hub has a hole for supplying lubricating oil radially outward, and
a wall surface of said flange are formed so as to smoothly introduce the lubricating oil from said hole toward an inner surface of said second cylindrical portion.

25. A torque convertor system according to claim 24, wherein an annular projection extending radially inward is formed in an end of said second cylindrical portion.

26. A torque convertor system according to claim 22, wherein said hub has a hole for supplying lubricating oil radially outward, and
a wall surface of said flange is formed so as to smoothly introduce the lubricating oil from said hole toward an inner surface of said second cylindrical portion.

27. A torque convertor system according to claim 26, wherein an annular projection extending inward in the radial direction is formed in an end of said second cylindrical portion.

28. A torque convertor system according to claim 22, wherein said through hole in said first cylindrical portion and said through hole in said second cylindrical portion are formed in approximately the same position in the axial direction.

29. A torque convertor system according to claim 1, wherein
said drive-side member has a hub, a flange extending radially outward from said hub, and a first cylindrical portion extending in an axial direction from an outer periphery of said flange,
said front cover has a third cylindrical portion extending in the axial direction, and
said sealing mechanism is a seal ring disposed between an outer surface of said first cylindrical portion and an inner surface of said third cylindrical portion.

30. A torque convertor system according to claim 1, further comprising a lock-up clutch disposed on an outside of said torque convertor body in a radial direction and in a space in an axial direction including said torque convertor body and the power disconnecting clutch for connecting and disconnecting said input-side rotation member to and from said power disconnecting clutch.

31. A power transmission device which can be mounted on a manual speed change gear in a vehicle, for transmitting power from an engine to said manual speed change gear, comprising:
a torque convertor body which is supplied with hydraulic operating fluid for transmitting power and can be connected to an input-side rotation member on the side of said engine;
a power disconnecting clutch for transmitting power from said torque convertor body;
a fluid chamber encompassing said torque convertor body and said power disconnecting clutch;

a housing containing said torque convertor body and said power disconnecting clutch;

an oil storing part disposed at the bottom of said housing for storing hydraulic fluid to be supplied to said torque convertor body and said power disconnecting clutch;

an oil pump fixed to said housing for pumping up the hydraulic fluid in said oil storing part; and a control valve provided in said housing for controlling the flow of the hydraulic fluid from said oil pump to supply the hydraulic fluid to said torque convertor body and said power disconnecting clutch.

32. A power transmission device according to claim 31, wherein an oil passage for transmitting hydraulic fluid to said torque convertor body and said power disconnecting clutch from said control valve is formed in a main drive shaft connected to said power disconnecting clutch.

33. A power transmission device according to claim 32, wherein:

hydraulic operating fluid is supplied to said torque convertor body through said oil passage in said main drive shaft, and said power disconnecting clutch has a drive-side member connected to said torque convertor body, a driven-side member connectable to said main drive shaft, a clutch part for connecting and disconnecting said drive-side member to and from said driven-side member, and an elastic connecting part for elastically connecting said driver-side member with said main drive shaft, and said drive-side member further comprising:

a sealing mechanism for preventing the hydraulic operating fluid in said torque convertor body from entering a space where said power disconnecting clutch is disposed.

34. A power transmission device according to claim 33, further comprising a front cover connected to said input-side rotation member, and wherein said torque convertor body comprises an impeller connected to said front cover and a turbine disposed opposite to said impeller, said drive-side member is fixed to rear surface of said turbine, and said clutch part is disposed radially outward of said drive-side member, and said drive-side member has a wall surface introducing lubricating oil supplied to its radially inner portion into said clutch part from said oil passage in said main drive shaft.

35. A power transmission device according to claim 34, wherein said power disconnecting clutch is disposed between said front cover and the rear surface of said turbine, and a recession concaved radially outward for concentrating lubricating oil is formed on an inner wall surface of an outer periphery wall of said front cover, a discharge hole for discharging the lubricating oil radially outward being formed in said recession.

36. A power transmission device according to claim 35, wherein said clutch part of said power disconnecting clutch comprises:

a plurality of first plates engaging with said drive-side member and movable in an axial direction, a second plate engaging with said driven-side member and movable in the axial direction, said second plate being interposed between said plurality of first plates, pressure means for pressing said first plates and said second plate against each other, and an elastic member disposed between said adjacent first plates, maintaining a predetermined clearance between the adjacent first plates at the time of releasing the pressing by said pressure means, and elastically deformed such that both said plates are pressed against each other at the time of the pressing.

37. A power transmission device according to claim 36, further comprising a lock-up clutch disposed radially outward of said torque convertor body and in a space formed in the axial direction with respect to said torque convertor body and said power disconnecting clutch, for connecting and disconnecting said input-side rotation member to and from said power disconnecting clutch.

38. A power transmission device according to claim 37, wherein said torque convertor body has in its radially inner end an impeller hub projecting outward in the axial direction, said torque convertor body further comprising:

an oil pump gear fixed to the axially outer end of said impeller hub and engaging with a driving gear of said oil pump, said oil pump gear having on its outer periphery a projection projected outward in the axial direction so as to receive hydraulic operating fluid leaking out of a radially inner portion of said impeller hub, said projection having a through hole for introducing said leaked hydraulic operating fluid into tooth portions of said oil pump gear and said driving gear.

39. A power transmission device according to claim 34, wherein said clutch part of said power disconnecting clutch comprises:

a plurality of first plates engaging with said drive-side member and movable in the axial direction, a second plate engaging with said driven-side member and movable in the axial direction, said second plate being interposed between said plurality of first plates, pressure means for pressing said first plates and said second plate against each other, and an elastic member disposed between said adjacent first plates, maintaining a predetermined clearance between the adjacent first plates at the time of releasing the pressing by said pressure means, and elastically deformed such that both said plates are pressed against each other at the time of the pressing.

40. A power transmission device according to claim 34, wherein said power disconnecting clutch is disposed between said front cover and the rear surface of said turbine, and a recession concaved radially outward for concentrating lubricating oil is formed on an inner wall surface of an outer periphery of said front cover, a discharge hole for discharging the lubricating oil radially outward being formed in the recession.

41. A power transmission device according to claim 40, wherein said clutch part of said power disconnecting clutch comprises:

a plurality of first plates engaging with said drive-side member and movable in an axial direction, a second plate engaging with said driven-side member and movable in the axial direction, said second plate being interposed between said plurality of first plates, pressure means for pressing said first plates and said second plate against each other, and an elastic member disposed between the adjacent first plates, maintaining a predetermined clearance between the adjacent first plates at the time of releasing the pressing by said pressure means, and elastically deformed such that both said plates are pressed against each other at the time of the pressing.

42. A power transmission device according to claim 33, wherein said clutch part of said power disconnecting clutch comprises:

a plurality of first plates engaging with said drive-side member and movable in an axial direction, a second plate engaging with said driven-side member and movable in the axial direction, said second plate being interposed between said plurality of first plates, pressure means for pressing said first plates and said second plate against each other, and an elastic member disposed between said adjacent first plates, maintaining a predetermined clearance between the adjacent first plates at the time of releasing the pressing by said pressure means, and elastically deformed such that both said plates are pressed against each other at the time of the pressing.

43. A power transmission device according to claim 33, further comprising a front cover connected to said input-side rotation member, and wherein said drive-side member has a hub, a flange extending radially outward from said hub, and a first cylindrical portion extending in the axial direction from an outer periphery of said flange, said front cover has a third cylindrical portion extending in the axial direction, and said sealing mechanism is a seal ring disposed between an outer surface of said first cylindrical portion and an inner surface of said third cylindrical portion.

44. A power transmission device according to claim 31, wherein said torque convertor body has in its radially inner end an impeller hub projecting outward in an axial direction, said torque converter body further comprising:

an oil pump gear fixed to an axially outer end of said impeller hub and engaging with a driving gear of said oil pump, said oil pump gear having an annular projection projecting outward in the axial direction such that it can receive hydraulic fluid leaking out of a radially inner portion of said impeller hub, said annular projection having a radial through hole for introducing the hydraulic fluid into tooth portions of said oil pumping gear and said driving gear.

45. A power transmission device according to claim 31, further comprising a lock-up clutch disposed radially outward of said torque convertor body and in a space formed in an axial direction including said torque convertor body and said power disconnecting clutch for connecting and disconnecting said input-side rotation member to and from said power disconnecting clutch.

46. A torque convertor comprising:

a torque convertor body having a toroidal shape for transmitting power from an input-side rotation member to an output-side member through hydraulic fluid;

a power disconnecting clutch disposed laterally of said torque convertor body for connecting and disconnecting said torque convertor body to and from said output-side member, said power disconnecting clutch including a torsion spring for absorbing a shock of clutch engagement; and a lock-up clutch disposed radially outward of said torque convertor body and in a space in an axial direction including said torque convertor body and said power disconnecting clutch for connecting and disconnecting said input-side rotation member to and from said power disconnecting clutch.

47. A torque convertor according to claim 46, further comprising:

a front cover connected to said input-side rotation member, having an outer cylindrical portion having in its end an outer cylindrical wall and an inner cylindrical wall, and an annular disk wall disposed opposite to said cylindrical portion in the axial direction, wherein said lock-up clutch is disposed in an annular groove formed by said outer cylindrical wall, said inner cylindrical wall and said annular disk wall.

48. A torque convertor according to claim 47, wherein said power disconnecting clutch comprises:

a drive-side member having a flange fixed to said torque convertor body and a first cylindrical portion extending in the axial direction from an outer periphery of said flange, said drive-side member further comprising a sealing member disposed between an outer surface of said first cylindrical portion and an inner surface of said inner cylindrical wall of said front cover.

49. A torque convertor according to claim 48, wherein said lock-up clutch comprises:

an annular piston disposed in said annular groove so as to be movable in the axial direction, a first disk-shaped plate which can abut against said annular piston and has radially outer end engaging with said front cover so as to be movable in the axial direction and non-rotatable relative to said front cover, and a second disk-shaped plate disposed between said first disk-shaped plate and said annular disk wall and having radially inner end engaging with the outer surface of said first cylindrical portion so as to be movable in the axial direction and non-rotatable relative to said drive-side member.

50. A torque convertor according to claim 49, wherein an oil passage for supplying hydraulic operating fluid to said annular groove is formed in said front cover in order to slidably move said annular piston in the axial direction.

51. A torque convertor according to claim 50, wherein said power disconnecting clutch further comprises a driven-side member connectable to said output-side member, a clutch part for connecting and disconnecting said drive-side member to and from said driven-side member, and an elastic connecting part for elastically connecting said driven-side member with said output-side member.

52. A torque convertor according to claim 51, wherein:

said clutch part is disposed radially inward of said first cylindrical portion of said drive-side member, and said wall surface of said drive-side member is shaped so as to introduce lubricating oil supplied to a radially inner portion of said drive-side member into said clutch part.

53. A torque convertor according to claim 52, wherein said power disconnecting clutch is disposed between said front cover and said torque convertor body, a recession concaved radially outward for concentrating lubricating oil is formed on an outer periphery of said front cover, a discharge hole for discharging the lubricating oil radially outward being formed in said recession.

54. A torque convertor according to claim 53, wherein said clutch part of said power disconnecting clutch comprises:

pressure means for pressing said first plates and said second plate against each other, and an elastic member disposed between the adjacent first plates, maintaining a predetermined clearance between the adjacent first plates at the time of releasing the pressing by said pressure means, said elastic member being deformed such that both said plates are pressed against each other at the time of the pressing.

55. A torque convertor according to claim 52, wherein said clutch part of said power disconnecting clutch comprises:

a plurality of disk-shaped first plates having radially outer ends engaging with the inner surface of said first cylindrical portion of said drive-side member so as to be movable in the axial direction and non-rotatable relative to said drive-side member, a disk-shaped second plate having radially inner end engaging with said driven-side member so as to be movable in the axial direction and non-rotatable relative to said driven-side member and disposed so as to be interposed between said plurality of first plates, pressure means for pressing said first plates and said second plate against each other, and an elastic member disposed between the adjacent first plates, maintaining a predetermined clearance between the adjacent first plates at the time of releasing the pressing by said pressure means, said elastic member being deformed such that both said plates are pressed against each other at the time of the pressing.

56. A torque convertor according to claim 51, wherein said power disconnecting clutch is disposed between said front cover and said torque convertor body, and a recession concaved radially outward for concentrating lubricating oil is formed on an outer periphery of said front cover, a discharge hole for discharging the lubricating oil radially outward being formed in the recession.

57. A torque convertor according to claim 56, wherein said clutch part of said power disconnecting clutch comprises:

a plurality of disk-shaped first plates having radially outer ends engaging with the inner surface of said first cylindrical portion of said drive-side member so as to be movable in the axial direction and non-rotatable relative to said drive-side member, a disk-shaped second plate having radially inner end engaging with said driven-side member so as to be movable in the axial direction and non-rotatable relative to said driven-side member and disposed so as to be interposed between said plurality of first plates, pressure means for pressing said first plates and said second plate against each other, and an elastic member disposed between the adjacent first plates, maintaining a predetermined clearance between the adjacent first plates at the time of releasing the pressing by said pressure means, said elastic member being deformed such that both said plates are pressed against each other at the time of the pressing.

58. A torque convertor according to claim 51, wherein said clutch part of said power disconnecting clutch comprises:

a plurality of disk-shaped first plates having radially outer ends engaging with the inner surface of said first cylindrical portion of said drive-side member so as to be movable in the axial direction and non-rotatable relative to said drive-side member, a disk-shaped second plate having radially inner end engaging with said driven-side member so as to be movable in the axial direction and non-rotatable relative to said driven-side member and disposed so as to be interposed between said plurality of first plates, pressure means for pressing said first plates and said second plate against each other, and an elastic member disposed between said adjacent first plates, maintaining a predetermined clearance between the adjacent first plates at the time of releasing the pressing by said pressure means, said elastic member being deformed such that both said plates are pressed against each other at the time of the pressing.

59. An oil pump gear lubricating structure of a torque convertor comprising:

a torque convertor body having in its radially inner end an impeller hub projecting outward in an axial direction, and an oil pump gear fixed to an axially outer end of said impeller hub and engaging with a driving gear of an oil pump, said oil pump gear having on its outer periphery a projection projecting outward in the axial direction such that it can receive hydraulic operating fluid leaking out of a radially inner portion of said impeller hub, said projection being provided with a through hole for introducing said leaked hydraulic operating fluid into tooth portions of said oil pump gear and said driving gear.

60. An oil pump gear lubricating structure according to claim 59, wherein said impeller hub is fixed to the radially inner portion of an impeller shell of said torque convertor body, and said impeller hub further comprising:

a bearing for supporting said impeller shell on a shaft fixed to a transmission housing, and a bush disposed between said impeller hub and said shaft on the side of said transmission housing from said bearing, said projection of said oil pump gear extending toward said transmission housing.

61. An oil pump gear lubricating structure according to claim 60, further includes clearances through which a predetermined amount of hydraulic fluid can pass, said clearances being formed between said bush and said shaft, and between said bush and said impeller hub.

62. An oil pump gear lubricating structure according to claim 60, further includes an oil passage groove in the axial direction on the inner surface and/or outer surface of said bush.

* * * * *